(No Model.) 2 Sheets—Sheet 1.

B. C. WHITE.
MACHINE FOR DRAWING RODS.

No. 323,763. Patented Aug. 4, 1885.

Witnesses:
Jno. W. Crockett.
G. Huzel.

Inventor,
B. Clark White
per M. E. Dayton
Attorney.

N. PETERS, Photo-Lithographer, Washington, D. C.

(No Model.) 2 Sheets—Sheet 2.

B. C. WHITE.
MACHINE FOR DRAWING RODS.

No. 323,763. Patented Aug. 4, 1885.

Witnesses:
Jno. W. Sockett.
G. Huzel.

Inventor,
B. Clark White
per M. E. Dayton
Attorney.

UNITED STATES PATENT OFFICE.

B. CLARK WHITE, OF CHICAGO, ILLINOIS, ASSIGNOR TO SAMUEL S. CHISHOLM, OF SAME PLACE.

MACHINE FOR DRAWING RODS.

SPECIFICATION forming part of Letters Patent No. 323,763, dated August 4, 1885.

Application filed September 22, 1884. (No model.)

*To all whom it may concern:*

Be it known that I, B. CLARK WHITE, of Chicago, in the county of Cook and State of Illinois, have invented certain new and useful Improvements in Machines for Drawing Metal Rods and Shafting; and I do hereby declare that the following is a full, clear, and exact description thereof, reference being had to the accompanying drawings, and to the letters of reference marked thereon, which form a part of this specification.

This invention relates to that class of machines for drawing metal shafting or rods in which devices are employed for keeping the rod accurately in the axis of the die while being drawn.

The principal object of the invention is to adapt the device of an endless draw-chain to this class of machines. It, however, embraces certain other features of improvement, which will hereinafter further appear.

In connection with the matters herein claimed others are shown, which form the subject of a separate application for patent filed simultaneously herewith.

In the machine invented by Winslow Allderdice, for which an application for Letters Patent of the United States was filed April 2, 1884, under the Serial No. 126,367, the draw-head is actuated by two heavy rotating screws located at the sides of the draw-head guides and parallel therewith, which screws engage interiorly-threaded openings in parts belonging to the draw-head. This construction is expensive and somewhat objectionable, because it is necessary to establish and maintain the parallelism not only of the guides themselves but also of the screws with each other and with the guides, and of all these parts with the axis of the die.

In the application filed by me of even date herewith a single reciprocating screw is employed by which to actuate the draw-head, said screw being supported in a definite relation to the die-axis.

In the present invention an endless chain is employed to give the desired movement to the draw-head, and it is only necessary in this case to properly guide and support the said draw-head with respect to the die-axis.

The invention consists in the several matters hereinafter set forth, and pointed out in the claims.

Figure 1:
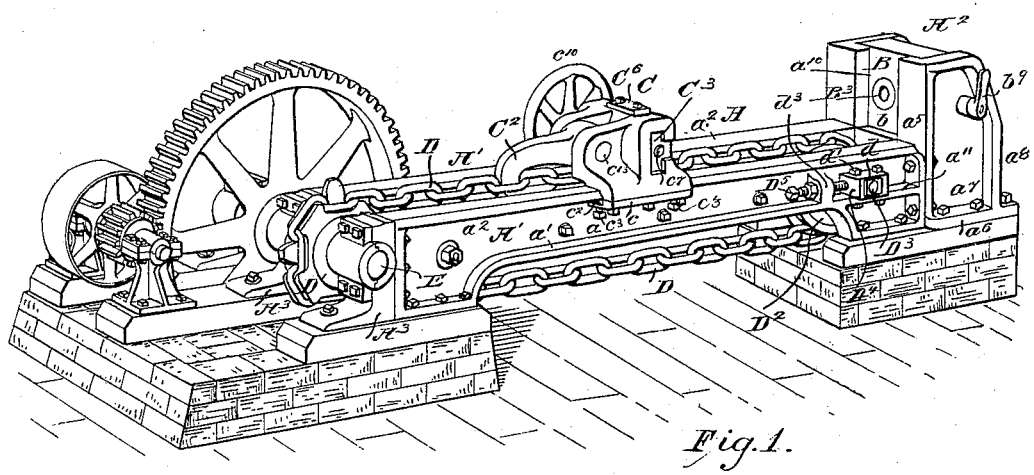
Figure 2:
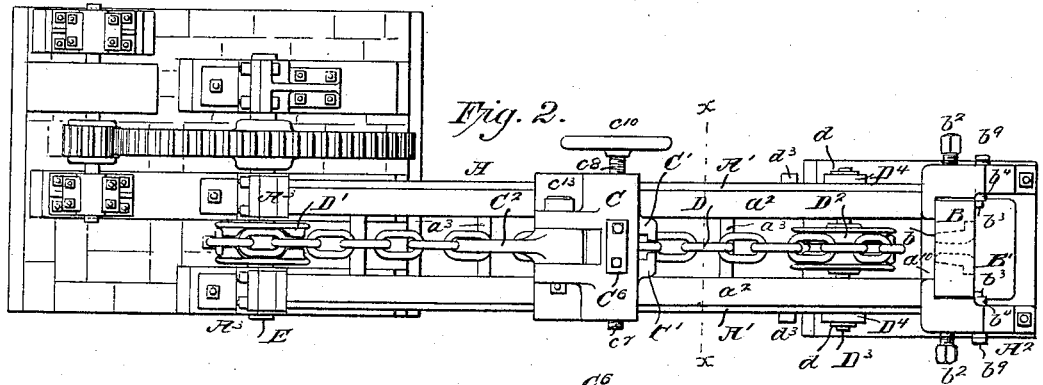
Figure 3:
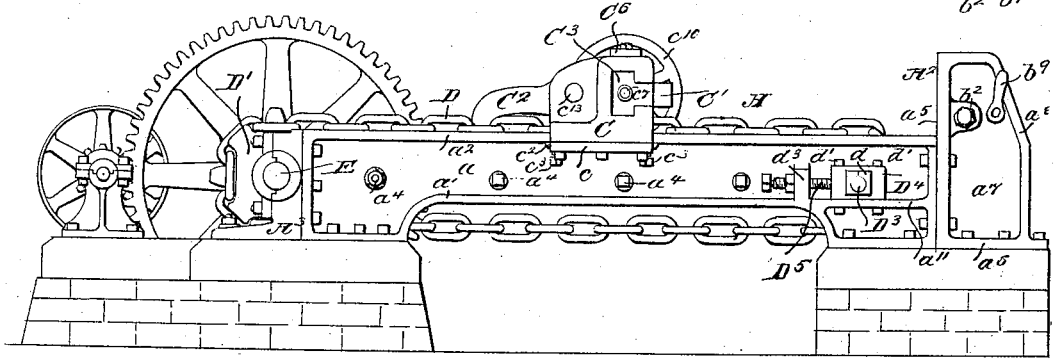
Figure 4:
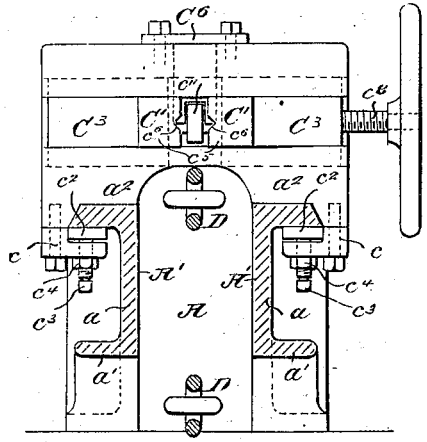
Figure 5:
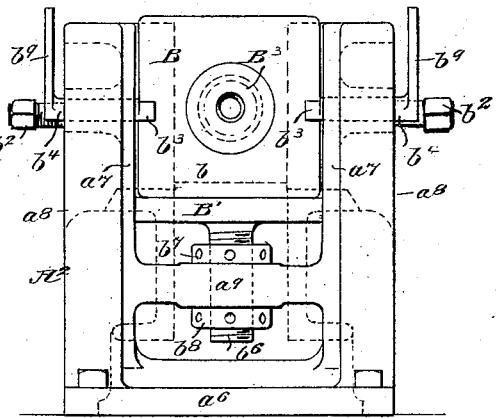
Figure 6:
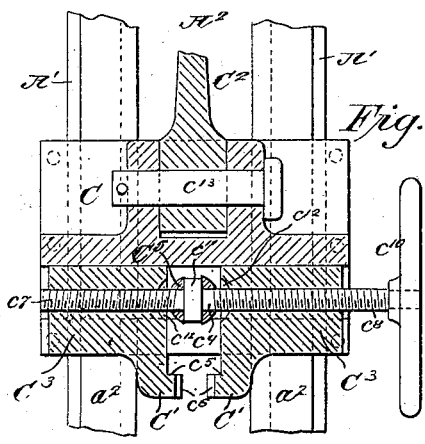
Figure 7:
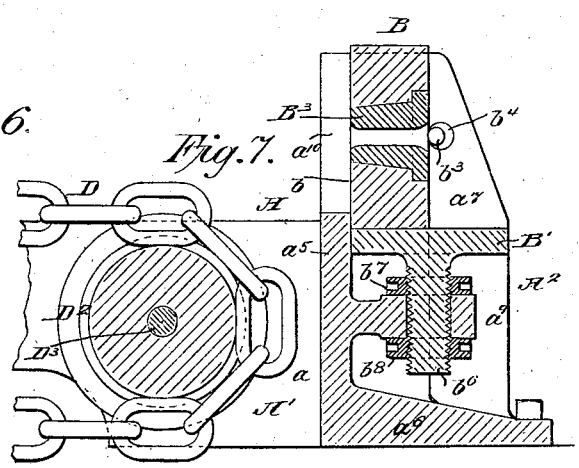
Figure 8:
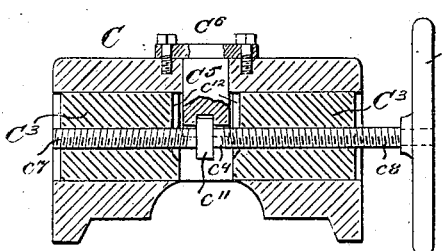
Figure 9:
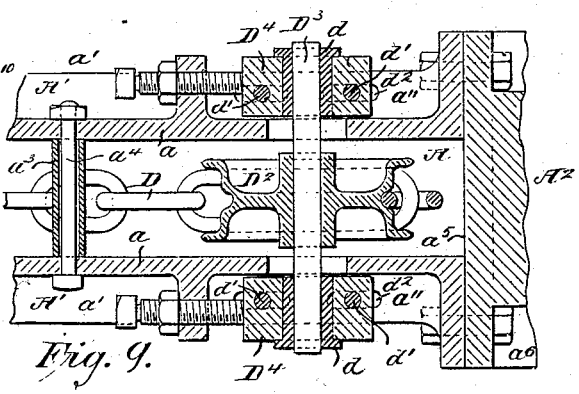

In the accompanying drawings, which represent a desirable form of machine embodying the invention, Figure 1 is a perspective view of the machine. Fig. 2 is a plan of the same. Fig. 3 is a side elevation of the same. Fig. 4 is a vertical cross-section of the same, on an enlarged scale, on the line $x$ $x$ of Fig. 2, looking toward the left. Fig. 5 is an end elevation showing that end of the machine in which the die is held. Fig. 6 is a horizontal section of the carriage or draw-head on a plane passing through the axis of the grip, also showing a portion of the ways on which the draw-head slides. Fig. 7 is a central vertical longitudinal section of the end of the machine in which the die is held, the rest of the machine being represented as broken away. Fig. 8 is a vertical cross-section of the draw-head on a plane passing through the axis of the gripping-screws. Fig. 9 is a horizontal longitudinal section of a portion of that end of the machine in which the die is held, showing the devices for adjusting the tension of the drag-chain. The five last-mentioned figures are on the same scale as Fig. 4.

The frame of the machine, which is preferably of cast-iron, and is designated as a whole by the letter A, consists of two strong, parallel, horizontal beams or girders, A' A', a vertical end frame piece or die-head, A$^2$, which is securely bolted to the ends of the girder A' A', and at the opposite ends of the girders two heavy pillow-blocks, A$^3$, one of which is bolted to each girder. All of these parts, together with additional bearings for the drawing mechanism, are bolted to solid foundations, as clearly shown in Figs. 1, 2, and 3, to secure the desirable rigidity and firmness in the machine. A seat, provided with clamping and adjusting devices, is formed in the frame-piece A$^2$ to adjustably receive and immovably hold the die-block B. Ways or guides are provided on the girders A' to carry the draw-head C and gripping-jaws C' parallel with the axis of the die. An endless chain, D, mounted on an actuating sprocket-wheel, D', at one end of the machine, and on a guide and tension pulley, D$^2$, at the opposite end, serves to actuate the draw-head C, which engages therewith by means of a hook, $C^2$, pivoted to the draw-head. All of these parts, with their adjustments and connections, will presently be described in detail.

Each of the girders A', as herein shown, consists of a vertical plate or web, $a$, having outwardly-directed horizontal flanges $a'$ $a^2$ on its upper and lower edges to impart the desired strength and rigidity, as clearly seen in Fig. 4. Each of the flanges $a'$ also serves as a base or foot plate by which the girder is secured to the masonry or other foundation, and both of the flanges $a^2$ are finished to afford straight guideways for the draw-head. The girders are held rigidly parallel with each other by suitable stays or struts, here shown as formed of tubular pieces $a^3$, and tie-bolts $a^4$, seen clearly in Figs. 2 and 9. The draw-head is finished to accurately fit upon the upper and beveled lateral surfaces of the ways $a^2$, and is prevented from rising therefrom by detachable flanges $c$, bolted to the outwardly-projecting ends thereof and extending inward under said ways. Gibs or bearing-plates $c^2$ are interposed between the flanges $c$ and the under side of the ways, and are made adjustable by set-screws $c^3$ and jam-nuts $c^4$ to secure an accurate running fit and to compensate for wear. The slides $C^3$, to which the gripping-jaws C' are attached, are mounted in the draw-head to slide transversely parallel with the top surfaces of the ways and perpendicular to the prolonged axis of the die. Said slides are T-shaped in cross-section, and fit accurately in a correspondingly-shaped transverse groove in the body of the draw-head, as clearly shown in Figs. 4, 6, and 8, the cross-bar of the "T" engaging vertical surfaces in the slot of the draw-head to receive the strain of the draft. The gripping-jaws are provided with hooked ends $c^5$, constructed to engage the head formed on the rod to be drawn, and centering-notches $c^6$ in their contiguous faces to center the neck which is formed for that purpose on the rod between the said head and the main body thereof. It is essential that the neck should be concentric with the body of the rod, in order that the axis of the latter shall correspond with the axis of the grip when the latter is closed on the said neck. The jaws C' are brought together to grasp the neck of the rod by equal-threaded right and left handed screws $c^7$ and $c^8$, formed on a longitudinally-fixed rod, $c^9$, and severally engaged with the interior screw-threaded holes in the said slides. The rod $c^9$ is rotated by a hand-wheel, $c^{10}$, to propel the slides inward or outward, and is restrained from longitudinal motion by a fixed collar, $c^{11}$, on said rod, which engages a slot in a fixed block, $C^5$, closely fitted in a vertical hole made in the body of the draw-head and held therein by a plate, $C^6$, bolted to the top of the draw-head over the said block. Recesses $c^{12}$ are shown in the inner ends of the slides $C^3$ to permit them to close around the block and thus bring the jaws together. The slides $C^3$ are arranged upon the screws with the gripping-points of the jaws at equal distances from a central vertical plane in the axis of the die, and the die is vertically adjustable, as will be hereinafter explained, so that when said die is properly set the rod is held by the jaws in accurate alignment with the aperature of the die. The die-head $A^2$ is preferably cast in one piece, and consists of a vertical plate, $a^5$, bolted to the ends of the girders A', and having a central opening, $a^{10}$, at the top to give passage to the rod being drawn, a horizontal extension or base-plate, $a^6$, bolted to the foundation, vertical webs or side pieces $a^7$, having outwardly-turned flanges $a^8$, and a horizontal web or plate, $a^9$. The inner face of the plate $a^5$ above the plate $a^9$ is finished accurately perpendicular to the ways $a^2$ to properly support the die-block B, against which the latter is clamped and held immovable while the machine is in operation. The die $B^3$ is set centrally in the die-block B, with its axis perpendicular to the plane surface $b$ of said block. The said die-block B rests upon a vertically-adjustable horizontal table, B', supported by the web $a^9$, by the adjustment of which table the axis of the die is brought vertically to coincide with the axis of the gripping-jaws. For the purpose of this adjustment the table B' is provided with a central depending screw, $b^6$, fitted to a vertical passage in the web $a^9$, and provided with spanner-nuts $b^7$ $b^8$, respectively above and below the web. To bring the die-axis into proper position laterally the die-block may be accurately constructed and fitted between the upright side plates, $a^7$, or it may be laterally adjustable between said plates by means of set-screws $b^2$, threaded through said side plates in position to bear against the vertical edges of the die-block. The die-block is firmly clamped against the upward projections of the plate $a^5$ by means of rotatable cylindric clamp-bars $b^4$, fitted to slide in suitable passages in the upright side plates, $a^7$, and provided at their inner ends with eccentrics $b^3$ and at their outer ends with the lever-handles $b^9$. These slides are located in position to bear the die-block forcibly forward when the eccentrics are turned in the position shown in Fig. 7 of the drawings. The slides $b^4$, constructed as described, may be moved longitudinally outward, thereby retracting their eccentric ends into the uprights so that the die-block may be horizontally removed from the table B' without being lifted over the eccentrics. The endless chain D has a movement in its upper part rearwardly from the die, such movement being imparted thereto by the sprocket-wheel D', which is fixed on the driving-shaft E, and is rotated by any suitable driving mechanism. The draw-head is detachably engaged with the said endless chain by a powerful hook, $C^2$, which is pivoted to the draw-head by a horizontal bolt, $c^{13}$, the point of the hook being formed to enter any one of the horizontal links of the chain, or otherwise constructed to engage with said chain. The hook being free to rise and fall on its pivot with any vertical oscillations or vibrations of the chain caused by the necessarily variable diameter of the sprocket-wheel D', such motions of the chain will not be communicated to the draw-head. In returning the draw-head after drawing a rod the hook $C^2$ is detached from the chain and the draw-head is pushed toward the die-head either by hand or by special mechanism for the purpose. The chain D is supported at one end of the machine by the sprocket-wheel D', and at the opposite end by a grooved guide and tension pulley, $D^2$, mounted on a shaft, $D^3$, having bearings $d\ d$, which are fitted into sliding blocks $D^4$. These latter rest upon and are bolted to special horizontal outwardly-projecting flanges, $a^{11}$, formed for that purpose on the girders A'. The bolts $d'$, by which they are held down on these flanges, pass through slotted openings $d^2$ in order to permit the blocks $D^4$ to be moved lengthwise of the machine in regulating the tension of the chain. The desired movement of the blocks $D^4$ is effected by set-screws $D^5$, passing through screw-threaded holes in the bracket, or lugs $d^3$, and bearing on the said blocks, jam-nuts being provided on the screws $D^5$ to secure the latter when the adjustment is completed.

The exact construction above described and represented in the accompanying drawings is not in all particulars necessary to the proper carrying out of the present invention in a working machine, as many modifications in the details and in the manner of connecting the parts to secure their co-operation for the purpose specified may be made without departing from the invention. The construction shown is, however, approved as being simple, durable, and easily operated.

Essentially the same construction and arrangement of the gripping-jaws on the draw-head and the vertically-adjustable bed for supporting the die-block are shown and claimed in the simultaneously-filed application for patent above referred to.

I claim as my invention—

1. In a rod-drawing machine, the combination, with a die-block constructed to hold the die, and a recessed die-head constructed to hold the die-block, of cylindric slides fitted to rotate and slide in transverse openings in the sides of the die-head, said slides having eccentrics at their inner ends constructed to engage the die-block when rotated in their inner position, substantially as specified.

2. The combination, with a die-head for holding a die-block in a fixed position in the frame, ways on said frame arranged parallel with the axis of the die, and a draw-head engaged with the ways, of an endless chain, D, sprocket-wheel D', constructed to engage the chain, means for actuating said sprocket-wheel, and a guide and tension pulley for the chain at the opposite end of the machine, substantially as and for the purpose described.

3. The combination, with the frame, a die-head for holding the die-block, a draw-head, ways for the draw-head, an endless chain, a sprocket-wheel, a tension-pulley, $D^2$, and shaft $D^3$, of sliding bearing-blocks $D^4$ and adjusting-screws $D^5$, substantially as and for the purpose set forth.

4. The combination, with the frame, the die, means for holding said die in a fixed position in the frame, ways, draw-head, and means for actuating said draw-head, of slides $C^3$, having jaws C', right-and-left screw $c^9$, having a collar, $c^{11}$, and a central slotted block, $C^5$, fixed in the draw-head and engaged with the collar of the screw, substantially as and for the purpose set forth.

5. The combination, with ways $a^2$, draw-head, and means for actuating said draw-head, of a die-head having a recess constructed to receive and hold the die-block, and provided with a web, $a^9$, a table, B', provided with a screw, $b^6$, and nuts $b^7$ and $b^8$, substantially as and for the purpose specified.

6. The combination, with a die-head, ways, draw-head, means for actuating said draw-head, and a die-block, of means for holding the die-block vertically and laterally and the rotatable sliding clamp-bars $b^4$, provided with eccentrics $b^3$, substantially as and for the purpose specified.

In testimony that I claim the foregoing as my invention I affix my signature in presence of two witnesses.

B. CLARK WHITE.

Witnesses:
M. E. DAYTON,
OLIVER E. PAGIN.